(12) United States Patent
Kooi et al.

(10) Patent No.: US 10,302,947 B2
(45) Date of Patent: May 28, 2019

(54) HEAD MOUNTED DISPLAY

(71) Applicant: Nederlandse Organisatie voor toegepast-natuurwetenschappelijk onderzoek TNO, s-Gravenhage (NL)

(72) Inventors: Frank Leonard Kooi, s-Gravenhage (NL); Anton Havekes, s-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/513,370

(22) PCT Filed: Sep. 22, 2015

(86) PCT No.: PCT/NL2015/050659
§ 371 (c)(1),
(2) Date: Mar. 22, 2017

(87) PCT Pub. No.: WO2016/048145
PCT Pub. Date: Mar. 31, 2016

(65) Prior Publication Data
US 2017/0307893 A1    Oct. 26, 2017

(30) Foreign Application Priority Data
Sep. 22, 2014   (EP) .................................... 14185727

(51) Int. Cl.
*G02B 27/01* (2006.01)
*G02F 1/137* (2006.01)
(Continued)

(52) U.S. Cl.
CPC ..... *G02B 27/0172* (2013.01); *G02B 27/0179* (2013.01); *G02F 1/137* (2013.01);
(Continued)

(58) Field of Classification Search
CPC ............ G02B 27/0172; G02B 27/0179; G02B 2027/0118; G02B 2027/0138;
(Continued)

(56) References Cited

U.S. PATENT DOCUMENTS

| | | | |
|---|---|---|---|
| 5,546,099 A | 8/1996 | Quint et al. |
| 5,913,591 A | 6/1999 | Melville |

(Continued)

FOREIGN PATENT DOCUMENTS

| | | | |
|---|---|---|---|
| JP | 2005172851 A | 6/2005 |
| JP | 2008185609 A | 8/2008 |

OTHER PUBLICATIONS

Laramee & Ware, Visual interference with a transparent head mounted display. CHI'01 Extended Abstracts on Human Factors in Computing Systems, Mar. 2001, pp. 323-324.

(Continued)

*Primary Examiner* — Jwalant Amin
(74) *Attorney, Agent, or Firm* — Banner & Witcoff, Ltd.

(57) ABSTRACT

A head mounted display device comprises an optical combiner that combines light from a display and light from an environment into light transmitted towards a user's eye. A controllable optical element located in the light path from the environment, optically between the environment and the optical combiner, for passing light from the environment switchable between filtering and not filtering by optical blurring or diffusion. The device comprises a camera directed at the environment. A control circuit uses image data from the camera to compute a measure of contrast and/or a measure of luminance in a measurement region within an image or images captured by the camera and applies a control signal to the control input dependent on the measure of contrast and/or the measure of luminance. This is used to create or increase the filtering effect of controllable (Continued)

optical element with an increase of the measure of contrast and/or the measure of luminance.

16 Claims, 2 Drawing Sheets

(51) Int. Cl.
  *G06F 3/01* (2006.01)
  *H04N 5/445* (2011.01)

(52) U.S. Cl.
  CPC ......... *G06F 3/013* (2013.01); *H04N 5/44504* (2013.01); *G02B 2027/014* (2013.01); *G02B 2027/0118* (2013.01); *G02B 2027/0138* (2013.01); *G02B 2027/0143* (2013.01); *G02B 2027/0187* (2013.01)

(58) Field of Classification Search
  CPC ...... G02B 2027/014; G02B 2027/0143; G02B 2027/0187; G02F 1/137; G06F 3/103; H04N 5/44504
  See application file for complete search history.

(56) References Cited

U.S. PATENT DOCUMENTS

| | | | |
|---|---|---|---|
| 6,731,253 | B1 | 5/2004 | Arnold |
| 7,605,719 | B1 | 10/2009 | Wenger et al. |
| 2006/0227258 | A1* | 10/2006 | Lee .................. G02F 1/133308 349/58 |
| 2009/0066680 | A1* | 3/2009 | Rumreich ................ G09G 5/00 345/207 |
| 2013/0021658 | A1 | 1/2013 | Miao et al. |
| 2013/0063486 | A1 | 3/2013 | Braun et al. |
| 2014/0055324 | A1 | 2/2014 | Hotta et al. |

OTHER PUBLICATIONS

Kooi & Toet, Visual comfort of binocular and 3D displays. Displays, 25(2), 2004, pp. 99-108.
Dec. 16, 2015- International Search Report and Written Opinion of PCT/NL2015/050659.
Kooi, F.L., & Toet, A., "Visual comfort of binocular and 3D displays." Displays, 25(2), (2004) pp. 99-108.

* cited by examiner

HEAD MOUNTED DISPLAY

CROSS-REFERENCE TO RELATED APPLICATIONS

This application is a U.S. National Stage application under 35 U.S.C. § 371 of International Application PCT/NL2015/050659 (published as WO 2016/048145 A1), filed Sep. 22, 2015, which claims the benefit of priority to EP 14185727.6, filed Sep. 22, 2014. Benefit of the filing date of each of these prior applications is hereby claimed. Each of these prior applications is hereby incorporated by reference in its entirety.

FIELD OF THE INVENTION

The invention relates to a head mounted display for displaying a display image overlaid with a view of a surrounding background environment to a user's eye.

BACKGROUND

US2013021658 discloses a head mounted display device that is designed to superimpose a computer generated display image on a background formed by part of the view of the surrounding environment. Such a head mounted display device comprises a display panel for displaying the computer generated image and an optical combiner that combines light of the display image from the display and background light along a same viewing axis to the user's eye, coming from the environment outside the head mounted device. The optical combiner combines light in a combiner area that forms only part of the field of view, so that the background light from the environment is visible adjacent the combiner area, without being combined with the overlaid computer-generated image outside the combiner area. The head mounted display device may be configured in the form of eyeglasses. Part of the system may be in integrated in the legs of the eyeglasses by which the eyeglasses are hooked to the user's ears. Google glass is an example of such a head mounted display device.

It has been found that overlay with the background can impair legibility of the display information. This could be solved by showing only the display image in part of the field of view without overlay, not as see-through, i.e. as an occluding HMD. However, an occluding HMD detracts from the view of the surroundings and it may affect stereoscopic viewing, especially if the display information if provided only to one eye. Maintaining visibility of the background overlaid with the display image has been found to improve visual comfort. However, the overlay still forms a burden for the user that wears this type of head mounted display device, because the user need more time to read the computer generated image. This increased reading time is an additional distraction from the surrounding environment.

US2014055324 discloses attenuation and more in particular blocking of background light behind the displayed information based on the state of the surroundings, e.g. it brightness. US2014055324 describes of an LCD to block the light by scattering the light. As is well known from use in displays, a liquid crystals can be used to block transmission of light by scattering it back.

SUMMARY

Among others it is an object to provide for a head mounted display device that makes it possible to reduce the burden associated with the display of an overlaid image.

A head mounted display device according to claim 1 is provided that comprises
a display,
an optical combiner arranged to combine light paths from the display and from the environment into a light path towards a user's eye,
a controllable optical element located in the light path between the environment and the eye, optically between the environment and the optical combiner, for passing light from the environment switchable between filtering and not filtering by optical blur or diffusion,
a camera directed at the environment, the camera having an image data output,
a control circuit coupled to the image data output and the control input, the control circuit being configured to use image data from the image data output to compute a measure of contrast and/or a measure of luminance in a measurement region within an image or images captured by the camera, and to apply a control signal to the control input dependent on the measure of contrast and/or the measure of luminance, whereby the filtering effect is created or increased with an increase of the measure of contrast and/or the measure of luminance.

This increases legibility when needed, by means of a small modification due to said filtering of the light from the environment in the overlay area of the combiner.

The modification is avoided or at least minimized under detected circumstances wherein it is not needed to maintain legibility of the display image, when the light from the environment in the overlay area has little contrast and/or low luminance. Even when the response to the detected circumstances involves a modification of the light from the environment in the overlay area, this modification is kept small by the use of filtering by optical blur (e.g. defocussing) or diffusion, i.e. by passing modified light from the environment, in a way that prevents that the eye from bringing the environment in the overlay area in focus at the same time as the display image and the environment outside the overlay area.

For example, in the case of high environmental contrast in the overlay area, i.e. large variation of intensity of the light from the environment or one or more of its components this form of filtering can be used to reduce contrast, by increasing the filtering effect either by switching it on in a step, or by gradually increasing the degree of filtering effect with increasing contrast. Similarly, the filtering effect may be applied only in the case of high luminance. Contrast is a particularly important criterion for the control of filtering to improve legibility, but the resulting modification of the environmental light can be further reduced without much loss of legibility by reducing the amount of filtering in the case of low luminance even when contrast is high. But control of filtering dependent on luminance already improves legibility, be it that it may involve filtering when filtering is not needed for legibility due to low contrast. Control of filtering dependent on contrast and/or luminance reduces eye fatigue because differences between the perceived environment in the overlay area and its surrounding are minimized and/or disparity between images in different eyes is reduced. From an article by Kooi, F. L., & Toet, A. titled Visual comfort of binocular and 3D displays. *Displays*, 25(2), (2004) pages 99-108 it is known per se that the two eyes are able to effortlessly fuse two images one of which is low pass filtered, and that the viewing comfort is better than with an image wherein luminance or contrast has been reduced instead of low pass filtering.

Filtering by diffusion destroys the spatial phase coherence of wavefronts of light from points in the environment so that the eye is prevented from forming an image. Filtering by diffusion may involve diffuse transmission and/or diffuse reflection. Blurring deforms the wavefronts without destroying phase coherence, at least not in a low spatial frequency band. Blurring may involve randomly different deformations in different parts of the overlay area. It has been found that blurring works better than diffusion for the purpose of minimizing the modification of the light from the environment while increasing the legibility of the display image. A small amount of blur/defocus is sufficient to guarantee good readability/legibility under all light conditions.

In an embodiment the controllable optical element comprises a controllable lens structure. The controllable optical element may comprise a plurality of controllable lenses. Controlled changes of the focal length or lengths of the controllable lens structure can be used to increase and decrease optical defocus and thereby blurring. In another embodiment the controllable optical element comprises a controllable optical diffuser. Such a diffuser may be realized by applying an electric field to small bubbles of liquid crystal material in a matrix, where the bubble can be made to act as random scatterers dependent on the field strength. When larger bubbles are used refraction dominates, the bubbles acting like lenses that spread the direction of forward light transmission, which results in field dependent blur.

In an embodiment the optical combiner has an input aperture in the light path from the environment, and the controllable optical element extends over all of the input aperture of the optical combiner. As used herein, the term "aperture" refers to an area in a (virtual) plane that faces the environment and through which the combiner receives light from the environment, without implying or denying the presence of a light blocking border around the aperture. By using all of the overlay it can be better ensured that legibility is increased where needed.

In an embodiment the measurement region comprises an overlay part of the image or images that shows light from an overlay range of directions from the environment that consists of all light directions from the environment over which the optical combiner is configured to superimpose a display image from the display, when viewed from the user's eye along the light path from the optical combiner towards the user's eye. Thus, the contrast and/or luminance at the location where the display image is visible can be measured. In practice, the contrast and/or luminance near but outside the overly area may also be used, since it will usually display similar contrast as the overlay area. But measurements in the overlay area reduce the risk of failure to filter when the overly area contains contrast and they reduce the risk of unnecessary filtering. In an embodiment, the measurement region has dimensions that are at most twice as large as the overlay part of the image or images. This minimizes failures to filter without unduly increasing unnecessary filtering.

In a monocular head mounted display an image(s) is superimposed on light from the environment on one eye only. Changing the background in one eye only may lead to eye fatigue due to differences between the images perceived by the two eyes. Contrast dependent control of filtering by optical blurring or diffusion minimizes this source of eye fatigue while maintaining legibility of the overlaid image.

In an embodiment, the overlay area and thus the controllable optical element is provided outside a head on viewing direction of the head mounted display device. The head on viewing direction of the device is the direction that corresponds to the head on viewing direction of the human user when a user wears the head mounted display device. For example, when the head mounted display comprises eyeglasses, the controllable optical element may be located in a corner of an eyeglass, covering only a fraction of the eyeglass. For example maximum diameter of the overlay range may be less than one half radian.

The controllable optical element may be implemented using a layer of material having an electric field dependent optical forward scattering or transmission properties and electrodes on opposite surfaces of said layer, the control input being configured to apply a voltage defined by the control signal between the electrodes. Such a device need not significantly add to the volume of a head mounted display. The control circuit may be configured to selectively disable measure of contrast dependent control of the controllable optical element dependent on image content of a display image displayed by the display and/or a received command. Thus filtering by diffusion or blurring may be disabled if the display image is detected not to contain symbols that could become less legible when the environment has high contrast and luminance. Disabling filtering dependent on image content minimizes the modification of the light passed in the overlay area, and makes the system more durable and energy efficient. Also application program control over filtering may be provided.

In an embodiment digital on/off control of filtering dependent on contrast and/or luminance is used. Alternatively, a more gradual dependence may be used.

BRIEF DESCRIPTION OF THE DRAWING

These and other aspects will become apparent from a description of exemplary embodiments with reference to the following figures.

DETAILED DESCRIPTION OF EXEMPLARY EMBODIMENTS

Figure 1:
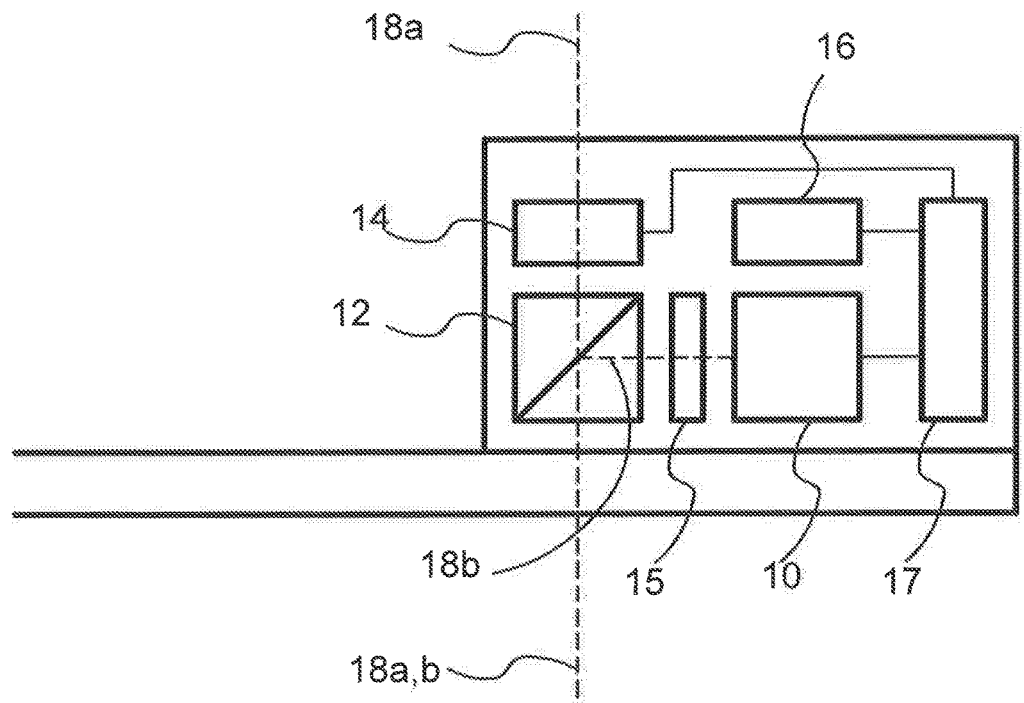
FIG. 1 shows a top view of the optical system of a head mounted display device.
Figure 2:
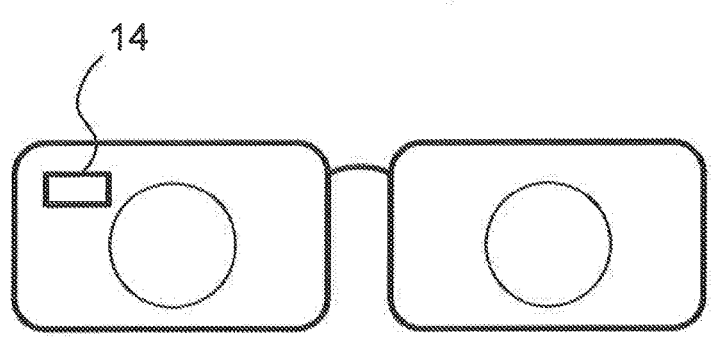
FIG. 2 shows a front view of the optical system of a head mounted display device.

FIGS. 1 and 2 schematically show a top view and a front view of the optical system of a head mounted display device respectively. The optical system comprises a display 10, an optical combiner 12, a controllable optical element 14, a lens 15 and a camera 16 and a processing system 17 electronically coupled to an output of camera 16 and a control input of controllable optical element 14. Processing system 17 may also be electronically coupled to an input of display 10. Optical combiner 12 may be said to have an aperture, which is an area in a (virtual) plane that faces the environment and through which it receives light from the environment. Preferably, optical element 14 overlay all of this aperture.

In a first embodiment, optical element 14 is a controllable optical diffuser. Controllable optical diffusers are known per se. An optical diffuser is any device, like frosted glass, that diffuses, spreads out or scatters light in some manner at least partly in the forward direction, usually distributed uniformly over all angles from the device, to transmit soft light.

In other embodiments, optical element 14 is a device that performs controllable optical blurring, for example by defocusing. Such a device will be referred to as a blurrer e.g. as a defocusing device. Blurring, for example by a lens or a transparent sheet with a bumpy surface that forms a collection of lenses that defocuses an image formed from the incoming light, affects wavefronts of incoming light so that the image formed from the incoming light becomes spatially low pass filtered compared to an image formed from that incoming light without blurring.

A first and second optical sub-system (not indicated) can be distinguished, which share optical combiner 12. The first optical sub-system comprises display 10, optical combiner 12 and lens 15, as well as any other optical components (not shown) of the head mounted display device involved in transmitting light from display 10 to eye 19. The second optical sub-system comprises controllable optical element 14 and optical combiner 12, as well as any other optical components (not shown) of the head mounted display device involved in transmitting light from outside the display 10 to eye 19 via controllable optical element 14 and optical combiner 12. In an embodiment, the second optical sub-system may be free of lenses. In another embodiment, the first and second optical sub-system may share a user lens (not shown) that is needed to enable the user to focus the environment, e.g. between optical combiner 12 and eye 19. Alternatively, such a user lens may be provided between optical combiner and the environment, in which case lens 15, or another lens (not shown) in the first optical subsystem may be used to compensate for the effect of the user lens.

A first and second light path 18*a,b* running through the first and second optical sub-system are schematically indicated. First light path 18*a* runs from display 10 to the user's eye 19 without passing through element 14. Second light path 18*b* runs from outside the head mounted display to the user's eye 19, display 10 being outside second light path 18*b*. Optical combiner 12 is located in both the first and second light paths 18*a,b*. From optical combiner 12 to the user's eye 19 first and second light paths 18*a,b* run along the same viewing axis 18*c*. Display 10 and lens 10 are located relative to optical combiner so that first light path 18*a* runs from display 10 to lens 16 via optical combiner 14. From lens 16, first light path 18*a* runs to eye 19 back via optical combiner 12. Element 14 is located relative to optical combiner 12 so that it is located in a part of the second light path 18*b* from the outside to optical combiner 12. From optical combiner 12 second light path 118*b* continues to eye 19. Camera 16 is directed at the environment along a direction 18*d* parallel to the direction of second light path 18*a*.

Operation of a part of the optical system comprising combination of display 10, optical combiner 12 and lens 15 is known per se. Optical combiner 12 passes light from an environment outside the device to eye 19 via the second light path 18*b*. Display 10 generates an image, and the optical system makes this image visible to eye 19 as a virtual image at an enlarged distance from the eye, so as to enable simultaneous focusing of eye 19 at the image and the environment.

Controllable optical element 14 provides for electronic control over the diffuseness of the light passed along second light path 18*b*. Typically, such a device comprises a layer of material with electric field dependent optical properties and pair of electrodes on opposite surfaces of this layer for generating an electric field through the layer.

Controllable optical element 14 may be an optical diffuser that comprises a polymer dispersed liquid crystal device (PDLC) for example. As is known per se, a PDLC device may comprise a layer of solid polymer containing droplets of liquid crystal dispersed enclosed within the solid polymer layer, and transparent electrodes on opposite surfaces of this layer. To control such a device a voltage is applied between the transparent electrodes. Increasing this voltage increases alignment of the liquid crystal material in the droplets. When the liquid crystal material is aligned the droplets pass the light so that images of objects behind the layer can be formed. Without alignment the droplets scatter the direction of the light passing through the diffuser, resulting in a loss of the spatial phase coherence so that images formed from objects behind the layer are blurred. Thus, without alignment, the layer behaves optically like frosted glass. If needed the degree of diffusion can be controlled by varying the voltage. When a PDLC with drops of a sufficient size to act as lenses is used, the PLDC may act as a blurrer.

Various embodiments may be used to implement controllable optical element 14 as an optical blurrer. The optical blurrer may comprise lens or lenses with electrically controllable focus length. Lenses with a controllable focus length are known per se. They may be made using material that has an electric field dependent index of refraction and/or using deformable lenses. A known type of deformable lens is realized for example by embedding deformable optical material, like a drop of transparent liquid or an transparent elastic polymer, in an mechanically deformable enclosure, the enclosure or one or more parts of the enclosure being located between electrodes. In this case a voltage is applied between electrodes to deform the enclosure and thereby the deformable optical material. In an embodiment such a deformable lens is placed in series with a fixed complementary lens, which is complementary in the sense that the fixed lens undoes the focusing effect of the complementary lens at one control voltage value of the deformable lens, which corresponds to the non-blurring state. Similarly a plurality of deformable lenses may each be placed in series with a fixed complementary lens.

In another example controllable optical element 14 comprises a blurring cell that contains a plurality of parallel layers, including a deformable layer of transparent material, a second transparent electrode layer and a first layer of transparent liquid bordering on the deformable layer, the light path from the environment to the combiner passing through the deformable layer, the first layer of liquid, and the second electrode layer. The deformable layer comprising a first electrode. Optionally, the first layer of liquid may lie between the electrode layers.

Processing system 17 may be coupled to the first and second electrode to apply a voltage between the first and second electrodes, to deform the deformable layer. E.g. when the deformable layer with the first electrode is fixed at its edges, it may be drawn to the second electrode at its center by an electric field between the electrodes. Optionally, such a cell may be designed so that the deformable deforms unevenly under influence of the electric field, e.g. by pre-treating the separating layer so that the elastic coefficient of its material varies as a function of position and/or by providing the first and/or second electrode on a substrate in a spatially patterned way, so that the electric force that draws the electrodes together varies dependent on position. The uneven deformation may be used to provide blurring. Because this occurs with variations at a smaller spatial frequency than the controllable optical element as a whole, the blurring effect can be realized with smaller device.

Optionally, a third transparent electrode may be provided, located so that the deformable layer lies between the second and third electrode. In this case use of different spatial patterns of the second and third electrode on their substrates may be used to provide for uneven deformation of the separation layer under influence of a control voltage, e.g. if processing system 17 is configured to apply the same potential to both the second and third electrode. This has the additional advantage that the deformable layer is electrically shielded by the second and third electrode.

Optionally, a second layer of transparent liquid or gas may be provided, with an index of refraction that differs from that of the first layer, the deformable layer forming a separating layer between the first and second layer of liquid or gas, the light path from the environment to the combiner passing Instead of liquid one of the liquid layer may contain a gas or a vacuum. In other embodiments, the layers need not contain electrodes, but the deformable layer may be deformed by means of one or more electrically controllable actuators arranged to exert a force or forces in a direction along the surface of the separating layer.

In another example, controllable optical element 14 may comprise a complementary first and second transparent layer each with unevenly distributed transmission properties and a controllable actuator. Herein the first and second transparent layer are arranged transverse to the light path from the environment, so that the light from the environment is transmitted to the combiner via the first and second transparent layer in series. The first layer is a layer designed so that per se it would result in blurring due to the unevenly distributed transmission properties. Such unevenly distributed transmission properties may be realized by using a transparent layer with an uneven (bumpy) surface so that it has a laterally varying thickness, or using a layer with laterally varying index of refraction, e.g. to a variable distribution of added doping, with a similar optical effect as thickness variation. The second layer has a surface with complementary unevenly distributed transmission properties, e.g. being thicker where the first layer is thinner and vice versa, or a higher index of refraction where the first layer has a lower index of refraction, so that that the optical effects of the layers compensate each other when they are aligned. In the controllable optical element 14 the controllable actuator is arranged to create relative lateral movement of the first and second layer, which results in increased blur when the layers are no longer aligned to compensate each other's optical effect. In another embodiment, one such layer is used with an uneven surface and liquid with the same index of refraction as the layer is applied or withdrawn to create a layer of the liquid on the uneven surface or remove it. The layer of the liquid acts as a layer with complementary optical effect when present. A pump e.g. based on an electrostatic effect may be used to apply or withdraw the liquid from the uneven surface.

In another known example of a lens with a controllable focus length the deformable lens is realized by means of the electro-wetting effect, i.e. by changing a solid-electrolyte contact angle by means of an applied potential difference between the solid and a liquid electrolyte. In this type of device one or more droplets of electrolyte (e.g. oil, or water) are provided between electrodes for applying a control voltage. When the electrolyte cannot be brought into a flat state, it may be combined with a fixed complementary lens.

The optical blurrer may comprise only a single deformable lens or it may comprise a plurality of such deformable lenses in parallel, optionally arranged in series with one or more fixed lenses to form an optical system. Preferably, the optical blurrer is configured so that the blurrer acts like a lens or a plurality of lenses at a first control voltage and not as a lens (i.e. like a flat plate, or a lens or lenses with infinite focal distance) at a second control voltage. In an electrowetting type lens electrodes at the lens edges relative to a drop of electrolyte that forms the lens may be used to deform the drop from a flat state to a curved state. If the single deformable lens cannot be brought to a flat state by application of the voltage, it may be used in combination with a fixed lens to form an optical system, wherein the fixed lens biases the overall focus length so that can be made infinite by application of the voltage.

Processing system 17 acts as a control circuit for controllable optical element 14. Processing system 17 may comprise a programmable computer and a memory containing a program of instructions for making the computer perform the control function. The program may be provided on a computer readable medium, such as a magnetic or optical disc, in a semi-conductor memory etc.

Processing system 17 is configured to control element 14 dependent on information from images captured by camera 16. Processing system 17 makes controllable optical element 14 switch or gradually vary between on one hand passing light from the outside substantially unaffected and on the other hand filtering out at least a spatially high frequency part. When element 14 is a diffuser, the filtering is performed by making the light diffuse, and when element 14 is a blurrer the filtering is performed by defocussing the light, so that when the users eye brings the image from display 10 in focus, the part of the environment on which it is overlaid is out of focus (keeping in mind that the head mounted display is configured to enable focusing the image of the display 10 and the environment outside the overlay part).

Processing system 17 controls the switch or gradual variation based on a measure of contrast in a measuring region from images captured by camera 16. When the measure of contrast indicates that the contrast exceeds a threshold, processing system 17 may increase the filtering by switching between passing light from the outside substantially unaffected and making it diffused or blurred. Alternatively, processing system 17 may make the light increasingly more diffused or blurred along a continuous range of diffusiveness or blurredness, or do so in a plurality of discrete steps, in response to increasing detected contrast in images captured by camera 16. The measuring region comprises that part of the image wherein the part of the environment is visible on which the wearer of the head mounted display device will perceive superposition of the image from display 10.

This has the effect that the head mounted display device will respond to a high measure of contrast in the measurement region by ensuring that the eye will perceive a diffused or blurred spatial intensity variation of the light from the environment where the image from display 10 is superimposed on it. This makes it easier to interpret the information displayed by display 10. For example, when display 10 displays text, the text will be easier to read. At the same time it is avoided that light from the environment is blocked or strongly reduced where the display image is superimposed. This reduces disparity between the images perceived by both eyes, which in turn reduces eye fatigue involved with binocular fusion. It has been found that controllable blurring works better than controllable diffusion for this purpose. In particular when a monocular had mounted display device is used, wherein blocking would occur only for one eye, a dark area that is visible only with one eye would increase eye fatigue. By using a controllable optical element 14, which preserves at least part of the light intensity from the environment, be it with less local contrast, the effect of this type of eye fatigue is reduced. It has been found that controllable blurring works better than controllable diffusion for this purpose. On the other hand, the view of the environment is left unobstructed when it is estimated that it does not perturb interpretability of the display image from display 10.

Figure 3:
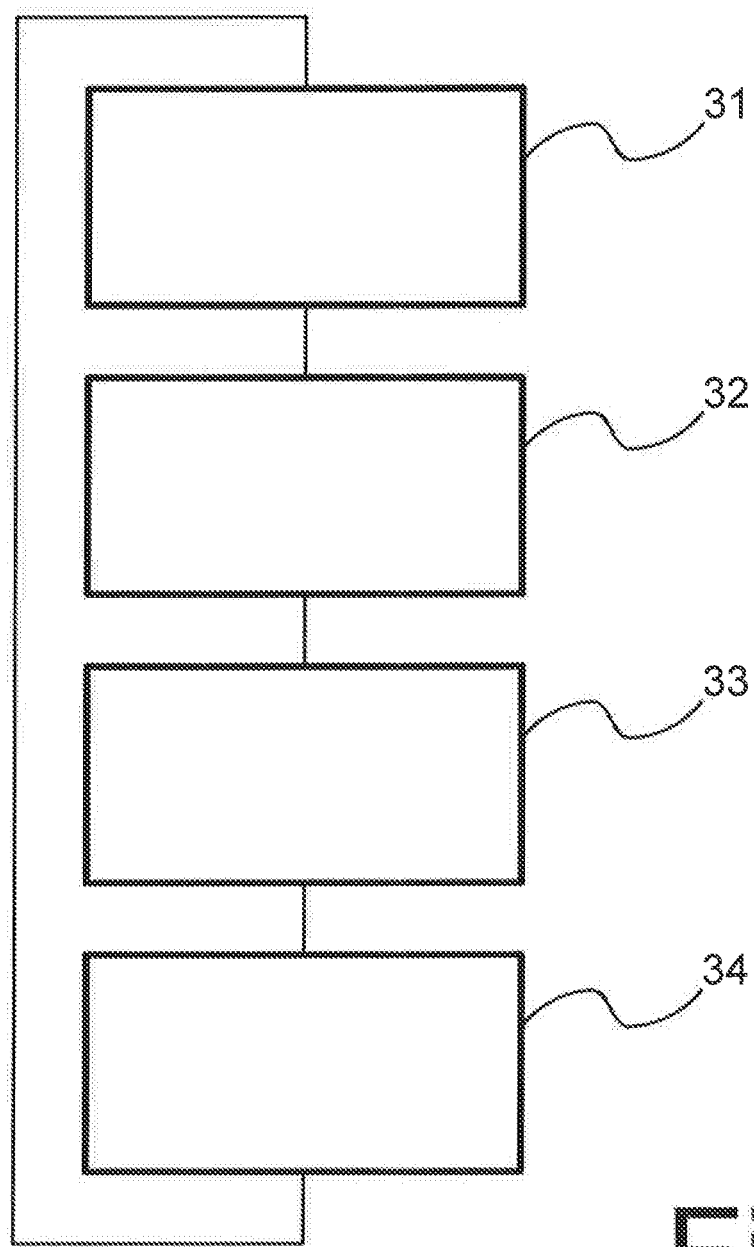
FIG. 3 shows a flow-chart of a process for controlling a diffuser or blurrer.

FIG. 3 shows a flow-chart of a process for controlling controllable optical element 14. In a first step 31, processing system 17 receives data representing a most recently captured image from camera 16. The captured image comprises image information from the part of the environment on which the wearer of the head mounted display device will perceive superposition of the image from display 10. In a second step 32, processing system 17 uses the data to compute a measure of image contrast in a predetermined measuring region in the captured image. In a third step 33, processing system 17 determines a control signal based on the measure of image for the most recently captured image and optionally the measure of image for one or more less recently captured images. In a fourth step 34, processing system 17 causes the control signal to be applied to the control input of controllable optical element 14. After fourth step 34, processing system 17 repeats the process for a next captured image.

Although processing system 17 has been described as part of the head mounted display device, so that all these steps may be executed in the head mounted display device, it should be appreciated that processing system 17 may comprise a wireless (e.g. radio) interface to an external processing system, which may execute part of the steps, e.g. second step 32 and/or third step 33 and optionally other functions described in the following. In this case processing system 17 may cause these steps to be executed by the external processing system, e.g. by transmitting or receiving the necessary data to or from the external processing system.

The control signal is determined so that controllable optical element 14 filters out high spatial frequency components from the image that will be formed in the eye of the user, by diffusing or by blurring with increasing measure of image contrast, for example by switching from no filtering to filtering with increasing contrast or by gradually increasing the filtering. Processing system 17 may be configured to switch of filtering by element when no images are displayed on display 10.

Optionally, second step 32 may also comprise using the data to compute a measure of image luminance in the measuring region, e.g. a sum of pixel intensity values in the measuring region. In this embodiment, third step 33 may comprise adjusting the control signal dependent on the measure of image luminance, so as to reduce filtering out with decreasing measure of image luminance, e.g. by setting the control signal to suppress filtering out if the measure of image luminance is below a predetermined threshold. Thus, processing system 17 may be configured to apply filtering out only if both the measure of image contrast and the measure of image luminance are sufficiently high. In an embodiment processing system 17 may apply gradual contrast dependent control only when the luminance is above a threshold, or apply gradual luminance dependent control when the contrast is above a threshold. It has been found that filtering is less needed at low image luminance, and that perception may be improved by avoiding filtering in that case, even if the measure of image contrast is high.

Any one of various methods may be used to compute the measure of image contrast in second step 32. The measure of image contrast is used as a measure of the extent to which content of the environment makes it more difficult to interpret the display image from display 10. For example, the standard deviation of a luminance in the measuring region may be computed from the data representing the captured image as a measure of contrast. As another example, the difference between the maximum and the minimum luminance in the measuring region may be computed as a measure of contrast, or the difference between the maximum and minimum intensity from a set of pixels that excludes a predetermined number of pixels with the highest and lowest intensities in the measuring region. As another example, any such type of measure may be computed from spatial high pass filtered or band pass filtered image intensity in the measuring region instead of direct pixel intensity. An example of band-pass filtering that could be used is convolution with a Difference of Gaussian (DOG) function, but other filters may be used. Similarly, the measure of image luminance may be computed from the luminance. Instead of computing contrast of luminance, specific color channels or other combinations thereof may be used to compute the measure of image contrast and optionally to use a measure of intensity of one or more light components (e.g. the G component of RGB pixel values), but not all, as a measure of luminance.

As measuring region for which the measure of contrast is computed in second step 32, processing system 17 may use a same predetermined measuring region under all circumstances. As noted the measuring region preferably includes a part of the image wherein that part of the environment is visible on which the wearer of the head mounted display device will perceive superposition of the image from display 10. This part will be called the overlay part. The content of the environment visible in the overlay part mainly determines the ease with which image content in the display image from display 10 can be interpreted. Therefore, it can be used to determine the effect of the environment on interpretability of the display image from display 10.

The location of the overlay part in the camera image may be affected by the orientation of the head mounted display device relative top the head of the user, as well as on the first and second optical sub-system. When a predetermined measuring region is used for determining the measure of contrast, this measuring region preferably comprises the collection of the overlay parts at all possible locations in the image for orientations allowed by the mounted display device.

Preferably, the measuring region includes only a portion of the camera image, e.g. with an dimensions in the x and y directions of no more than twice those of the overlay part of twice those of the collection of overlay parts at all the possible locations. In this way it may be ensured that substantially only the contrast that matters for interpretability is measured. Thus it is avoided that contrast in other image parts, far away from the overlay part can give rise to an increase in diffusiveness or blurring if there is no problematic contrast in the overlay part. If the measuring region has dimensions no more than twice those of the overlay part, contrast in the overlay part and the part of the measurement region outside the overlay part usually does not differ significantly.

The position of the overlay part in the image formed by the eye may depend on the orientation of the head mounted display relative to the head of the user. In some cases this could make the relation between the overlay part in the camera image and the eye image dependent on the orientation of the head mounted display. When a head mounted display is used that allows only for a small range of orientations, a fixed overlay part in the camera image may be used. Optionally, the relative orientation of the head mounted display with respect to the head may be measured and the location of the overlay part in the camera image may be adapted dependent on the measured orientation. In an embodiment, the head mounted display device comprises an eye ball tracker used for measuring the relative orientation of the head mounted display. In this embodiment, processing system 17 may be configured to adapt the measuring region dependent on the eye position measured by the eye ball tracker. Given the measured position of the eye relative to the head mounted display device, the optical properties of the optical system and the properties of camera 16, processing system 17 may compute the direction of one or more rays from the eye through one or more points on element 14 (e.g. a central point or points at the corners of element 14) and the one or more points in the camera image at which objects in will be visible along these rays. Based on these one or more points in the camera image processing system 17 may select the measuring region. In this way it can more accurately be avoided that irrelevant contrast can give rise to an increase in diffusiveness or blurring if there is no problematic contrast in the overlay part.

The determination of the control signal in third step 33, may be performed by comparing the measure of contrast with a threshold level. The threshold level may be a fixed level, set based on experiments with interpretability at different levels of contrast without diffusion or blurring. In an embodiment, processing system 17 may have an application program interface to receive and execute commands, e.g. from software executed by processing system to control the content of the display image on display 10, to adjust the threshold level.

Similarly, processing system 17 may have an application program interface (program) configured to receive and execute commands to enable and/or disable adjustment of diffusiveness or blurring. Processing system 17 may be configured to switch to a state where it controls element 14 to pass light from the environment substantially unaffected, irrespective of the measure of contrast. Processing system 17 may be configured to switch to a another state where it controls element 14 to diffuse light from the environment irrespective of the measure of contrast in response to a command.

In an embodiment processing system 17 may be configured monitor content of the display content to be displayed on display 10 and to enable and/or disable adjustment of diffusiveness or blurring dependent on that content. Processing system 17 may be configured to switch to a state where it controls element 14 to pass light from the environment substantially unaffected, irrespective of the measure of contrast when the content contains no text or other symbols for example. Processing system 17 may be configured to adjust the threshold level dependent on a further measure of contrast of the detected content of the display image for example.

Instead of using a threshold to generate on/off diffusion or blurring, processing system 17 may be configured to vary the degree of diffusion or blurring applied by element 14 along a (quasi-) continuous scale. Processing system 17 may be configured to use a lookup table or mathematical formula that defines control signals for element 14 dependent on the computed measure of contrast. For example, processing system 17 may do so to maintain perception of a substantially constant degree of contrast of the light from the environment on which the wearer of the head mounted display device will perceive superposition of the image from display 10. The perceived degree of contrast depends on the contrast from the environment and the effect of element 14. The measure of contrast in the overlay part of the image gives an indication of the contrast from the environment, and the content of the lookup table or mathematical formula may be selected to define control signals for element 14 that result in the same contrast at the eye given different computed values of the measure of contrast.

The content of the lookup table or mathematical formula may be selected at a calibration stage for example by capturing images at the position of the eye from environments with different contrasts by means of a camera like camera 16, computing the measure of contrast for these images, varying the value of the control signal of element 14 until a value of the control signal is found that results in a predetermined value of the latter measure of contrast and storing the value of the control signal in the look-up table in association with (e.g. at an address corresponding to) the measure of contrast obtained using camera 16 for the same environment, or setting coefficients of the mathematical formula according to such a look up table.

As in the case of using a threshold, processing system 17 may be configured to change the relation between the measure of contrast and the control signal of element 14 dependent on the content of the display image from display 10 or commands received by processing system 17.

Although transparent PDLCs have been described as an example of a controllable diffuser, it should be appreciated that any other type of controllable optical element 14 may be used that provides for electronically controllable diffusiveness in the sense of reduction or removal of spatial phase coherence of wave fronts when light from such wave fronts is passed through the controllable optical element, e.g. by limiting the coherence distance. Although a device comprising material with electrically controllable optical properties in a layer with transparent electrodes on both sides has been described, it should be appreciated that alternatively one of the electrodes may optically reflective. In such an embodiment a more complicated optical system must be used that is configured to direct light from the environment to the eye via reflection by the element 14 before being combined with light from display 10. However, use of a transparent element 14 simplifies the optical design. In alternatives to a PDLC, element 14 may be implemented using any layer comprising any kind of spatially inhomogeneous distribution of material with electric field dependent index of refraction may be used, with transparent electrodes on both surfaces.

In the described embodiment controllable optical element 14 is configured to switch or vary the diffuseness or blurring of its entire controllable surface as a whole in the same way in response to a control signal for element 14. For example the controllable surface of the layer of controllable material may be covered on each side by a single electrode. However, alternatively arrays of electrodes may be used. The same control signal may be applied to all electrodes in the array. In another embodiment, processing system 17 may be configured to control such electrodes in a position dependent way, for example dependent on the content of the display image from display 10 and/or the images from camera 16.

The head mounted display device comprises an optical combiner that combines light from a display and light from an environment into light transmitted towards a user's eye. A controllable optical element located in the light path from the environment, optically between the environment and the optical combiner, for passing light from the environment switchable between filtering and not filtering by optical blurring or diffusion. The device comprises a camera directed at the environment. A control circuit uses image data from the camera to compute a measure of contrast and/or a measure of luminance in a measurement region within an image or images captured by the camera and applies a control signal to the control input dependent on the measure of contrast and/or the measure of luminance. This is used to create or increase the filtering effect of controllable optical element with an increase of the measure of contrast and/or the measure of luminance.

The filtering by blur or diffusion may reduce the visibility of the background, e.g. for a binocular head mounted display. In the case of a monocular head mounted display it increases eye strain. However, these effects are reduced compared to the case wherein the background is completely occluded. Furthermore, these effects have been found to be significantly less with blur than with scatter. The filtering is preferably applied only when it has most effect in legibility: when a display image is projected over the background, when the background has more than a threshold contrast and/or when the background has more than a threshold luminance. Preferably, the filtering is applied only at peripheral locations (i.e. not in the head on viewing direction of the head mounted device. This can be applied both the monocular and binocular head mounted devices. In monocular mounted devices it reduces eye strain due to interference with stereo vision.

In an embodiment the optical blurrer may comprise an aniseiconic lens, e.g. a lens has different lens effect on different color components. Thus the aniseiconic lens may result in defocus of image component in an image plane where one color component is in focus. Use of such a lens has the effect that little or no eye strain occurs. Optionally, a fixed aniseiconic lens may be used, without controllable filtering. For example an aniseiconic lens may be used that reduces viewing sharpness to 0.3.

The invention claimed is:
1. A head mounted display device comprising
   a display,
   an optical combiner arranged to combine light paths from the display and from the environment into a light path towards a user's eye,
   a controllable optical element located in the light path from the environment, optically between the environment and the optical combiner, for passing light from the environment switchable between filtering and not filtering by optical blurring,
   a camera directed at the environment, the camera having an image data output,
   a control circuit coupled to the image data output and the control input, the control circuit being configured to use image data from the image data output to compute a measure of contrast and/or a measure of luminance in a measurement region within an image or images captured by the camera, or cause the measure of contrast and/or the measure of luminance to be computed, and to apply a control signal to the control input dependent on the measure of contrast and/or the measure of luminance, whereby the filtering effect is created or increased with an increase of the measure of contrast and/or the measure of luminance.
2. A head mounted display device according to claim 1, wherein the controllable optical element comprises a controllable lens structure.
3. A head mounted display device according to claim 1, wherein the controllable optical element comprises a volume of transparent liquid and a deformable layer of transparent material bordering on the volume of transparent liquid, and means for controlling deformation of the deformable layer under control of the control signal, by controlling an electric field between a first transparent electrode comprised in the deformable layer and a second transparent electrode facing the deformable layer, or by controlling a force exerted by an actuator on an edge of the deformable layer.
4. A head mounted display device according to claim 1, wherein the control circuit is configured to compute the measure of contrast and the measure of luminance in the measurement region, and to apply a control signal to the control input dependent on the measure of contrast, creating or increasing the filtering effect with an increase of the measure of contrast, and furthermore dependent on the measure of luminance, whereby the filtering effect is decreased with a decrease of the measure of luminance.
5. A head mounted display device according to claim 4, wherein the optical combiner has an input aperture in the light path from the environment, and wherein the controllable optical element extends over all of the input aperture of the optical combiner.
6. A head mounted display device according to claim 5, wherein the measurement region comprises an overlay part of the image or images that shows light from an overlay range of directions from the environment that consists of all light directions from the environment over which the optical combiner is configured to superimpose a display image from the display.
7. A head mounted display device according to claim 6, wherein the measurement region has dimensions that are at most twice as large as the overlay part of the image or images.
8. A head mounted display device according to claim 1, comprising an eye ball tracker, the control circuit being configured to adapt a position of the measurement region in the image or images dependent on an orientation of the optical combiner relative to a user's head as determined from a measured direction from the eye ball tracker to the user's eye.
9. A head mounted display device according to claim 1, wherein the head mounted display device is configured to display images superimposed on light from the environment on one eye only.
10. A head mounted display device according to claim 1, wherein the optical combiner is configured to superimpose images from the display over light from an overlay range of from the environment, the combiner being configured so that the overlay range lies outside a head on viewing direction of the head mounted display device.
11. A head mounted display device according to claim 1, wherein the optical combiner is configured to superimpose images from the display over light from an overlay range of from the environment, a maximum diameter of the overlay range being less than half a radian.
12. A head mounted display device according to claim 1, wherein the controllable optical element comprises a layer comprising material having an electric field dependent optical forward scattering or transmission properties and electrodes on opposite surfaces of said layer, the control input being configured to apply a voltage defined by the control signal between the electrodes.
13. A head mounted display device according to claim 1, wherein the control circuit is configured to selectively disable measure of contrast dependent control of the controllable optical element dependent on image content of a display image displayed by the display and/or a received command.
14. A head mounted display device according to claim 1, wherein the control circuit is configured to switch the control signal between control values to apply a first degree of filtering effect and no filtering effect, or a second degree of filtering effect that is smaller than said first degree of filtering effect, dependent on whether the measure of contrast is above or below a predetermined threshold respectively.

15. A head mounted display device comprising:
    a display,
    an optical combiner arranged to combine light paths from the display and from the environment into a light path towards a user's eye,
    a controllable optical element located in the light path from the environment, optically between the environment and the optical combiner, for passing light from the environment switchable between filtering and not filtering by optical diffusion that diffuses, spreads out or scatters light at least partly in a forward direction towards the optical combiner,
    a camera directed at the environment, the camera having an image data output,
    a control circuit coupled to the image data output and the control input, the control circuit being configured to use image data from the image data output to compute a measure of contrast and/or a measure of luminance in a measurement region within an image or images captured by the camera, or cause the measure of contrast and/or the measure of luminance to be computed, and to apply a control signal to the control input dependent on the measure of contrast and/or the measure of luminance, whereby the filtering effect is created or increased with an increase of the measure of contrast and/or the measure of luminance.

16. A head mounted display device according to claim 15, wherein the controllable optical element comprises a controllable optical diffuser.

* * * * *